(12) United States Patent
Kim et al.

(10) Patent No.: US 11,486,716 B2
(45) Date of Patent: Nov. 1, 2022

(54) VEHICULAR ELECTRONIC DEVICE, OPERATION METHOD OF VEHICULAR ELECTRONIC DEVICE, AND SYSTEM

(71) Applicant: LG Electronics Inc., Seoul (KR)

(72) Inventors: Sungmin Kim, Seoul (KR); Jihyun Kim, Seoul (KR); Jinsang Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/260,105

(22) PCT Filed: Nov. 1, 2018

(86) PCT No.: PCT/KR2018/013204
§ 371 (c)(1),
(2) Date: Jan. 13, 2021

(87) PCT Pub. No.: WO2020/091112
PCT Pub. Date: May 7, 2020

(65) Prior Publication Data
US 2021/0310815 A1    Oct. 7, 2021

(51) Int. Cl.
*G01C 21/32* (2006.01)
*G01C 21/00* (2006.01)
*G07C 5/08* (2006.01)

(52) U.S. Cl.
CPC ......... *G01C 21/32* (2013.01); *G01C 21/3804* (2020.08); *G01C 21/3881* (2020.08); *G07C 5/085* (2013.01)

(58) Field of Classification Search
CPC .............. G01C 21/32; G01C 21/3804; G01C 21/3881; G01C 21/3889; G07C 5/085; B60R 16/03; B60W 30/14; B60W 40/02; B60W 40/105; G05D 1/00; G05D 1/02
See application file for complete search history.

(56) References Cited

U.S. PATENT DOCUMENTS

| | | | |
|---|---|---|---|
| 2002/0021229 A1* | 2/2002 | Stein ..................... | G08G 1/166 340/933 |
| 2017/0372148 A1* | 12/2017 | Chen .................... | G08G 1/0104 |
| 2018/0188743 A1* | 7/2018 | Wheeler ................ | G01C 21/32 |

(Continued)

FOREIGN PATENT DOCUMENTS

| KR | 20150082429 A | * 7/2015 | ................ B60T 7/12 |
|---|---|---|---|
| KR | 20180086632 A | * 8/2018 | |

OTHER PUBLICATIONS

Machine Translation: KR-20180086632-A (year:2018).*
Machine Translation: KR-20150082429-A (year:2015).*

*Primary Examiner* — Anne Marie Antonucci
*Assistant Examiner* — Connor L Knight
(74) *Attorney, Agent, or Firm* — Fish & Richardson P.C.

(57) ABSTRACT

The present disclosure relates to a vehicular electronic device including a power supply configured to supply power, an interface configured to receive HD map data on a specific area from a server through a communication device and receive data on driving condition information of a vehicle, and a processor configured to continuously generate electronic horizon data on a specific area based on the high-definition (HD) map data in the state of receiving the power and to set a geographical range of the electronic horizon data based on data on the driving condition information.

15 Claims, 14 Drawing Sheets

(56) References Cited

U.S. PATENT DOCUMENTS

| | | | | |
|---|---|---|---|---|
| 2019/0301872 A1* | 10/2019 | Jin | .................... | G06K 9/00825 |
| 2019/0323855 A1* | 10/2019 | Mahler | ................ | G08C 21/00 |
| 2020/0124423 A1* | 4/2020 | Jiang | .................. | G05D 1/0088 |
| 2021/0300243 A1* | 9/2021 | Shimizu | ............. | B60W 30/095 |

* cited by examiner

VEHICULAR ELECTRONIC DEVICE, OPERATION METHOD OF VEHICULAR ELECTRONIC DEVICE, AND SYSTEM

CROSS-REFERENCE TO RELATED APPLICATIONS

This application is a National Stage application under 35 U.S.C. § 371 of International Application No. PCT/KR2018/013204, filed on Nov. 1, 2018. The disclosure of the prior application is incorporated by reference in its entirety.

TECHNICAL FIELD

The present disclosure relates to a vehicular electronic device, an operation method of the vehicular electronic device, and a system.

BACKGROUND ART

A vehicle is an apparatus that moves in a direction desired by a user riding therein. A representative example of a vehicle is an automobile. In the automobile industry field, for convenience of a user driving a vehicle, research on an advanced driver assistance system (ADAS) application is actively underway. Further, research on an autonomous driving application for a vehicle is actively being conducted.

The ADAS application or the autonomous driving application may be constituted based on map data. According to the conventional art, small-sized standard-definition (SD) map data is provided to a user in the state of being stored in a memory provided in a vehicle. However, with the recent demand for voluminous high-definition (HD) map data, a cloud service is utilized for provision of map data.

In order to process data of the ADAS application and the autonomous driving application, constituted based on HD maps, capability to process a large amount of data and capability to store a large amount of data are required. Even if a high-performance processor and a high-performance memory are used, the resources of the processor and the memory provided in a vehicle are limited, and therefore there is a need for research on technology for efficiently implementing data-processing capability and data storage capability.

DISCLOSURE

Technical Problem

The present disclosure has been made in view of the above problems, and it is an object of the present disclosure to provide a vehicular electronic device that sets a geographical range of electronic horizon data in accordance with driving condition information.

In addition, it is an object of the present disclosure to provide an operation method of a vehicular electronic device that sets a geographical range of electronic horizon data in accordance with driving condition information.

In addition, it is an object of the present disclosure to provide a system that sets a geographical range of electronic horizon data in accordance with driving condition information.

The objects to be accomplished by the disclosure are not limited to the above-mentioned objects, and other objects not mentioned herein will be clearly understood by those skilled in the art from the following description.

Technical Solution

In order to accomplish the above objects, a vehicular electronic device according to an embodiment of the present disclosure includes a power supply configured to supply power, an interface configured to receive HD map data on a specific area from a server through a communication device and to receive data on driving condition information of a vehicle, and a processor configured to continuously generate electronic horizon data on a specific area based on the high-definition (HD) map data in the state of receiving the power and to set a geographical range of the electronic horizon data based on data on the driving condition information.

According to an embodiment of the present disclosure, the driving condition information includes sensing range information of at least one sensor included in an object detection device, and the processor sets a geographical range of the electronic horizon data such that the geographical range corresponds to the sensing range of the at least one sensor.

According to an embodiment of the present disclosure, the electronic horizon data includes horizon path data including data on a main path, which is defined as a trajectory obtained by connecting roads having a high relative probability of being selected, and data on a sub-path, which branches from at least one decision point on the main path.

According to an embodiment of the present disclosure, the driving condition information includes driving speed information of the vehicle. Upon determining that the driving speed of the vehicle is decreasing, the processor reduces the geographical range of the main path in the traveling direction of the vehicle, and increases the geographical range of the sub-path in the leftward-rightward direction of the vehicle.

According to an embodiment of the present disclosure, the driving condition information includes traffic volume information. Upon determining that a traffic volume is increasing, the processor reduces the geographical range of the main path in the traveling direction of the vehicle, and increases the geographical range of the sub-path in the leftward-rightward direction of the vehicle.

Details of other embodiments are included in the detailed description and the accompanying drawings.

Advantageous Effects

According to the present disclosure, there are one or more effects as follows.

First, a geographical range of electronic horizon data is set in accordance with driving condition information, whereby there is an effect of improving processing efficiency.

Second, unnecessary HD map data is prevented from being received, whereby there is an effect of preventing unnecessary data communication.

The effects achievable through the disclosure are not limited to the above-mentioned effects, and other effects not mentioned herein will be clearly understood by those skilled in the art from the appended claims.

BEST MODE

Figure 1:
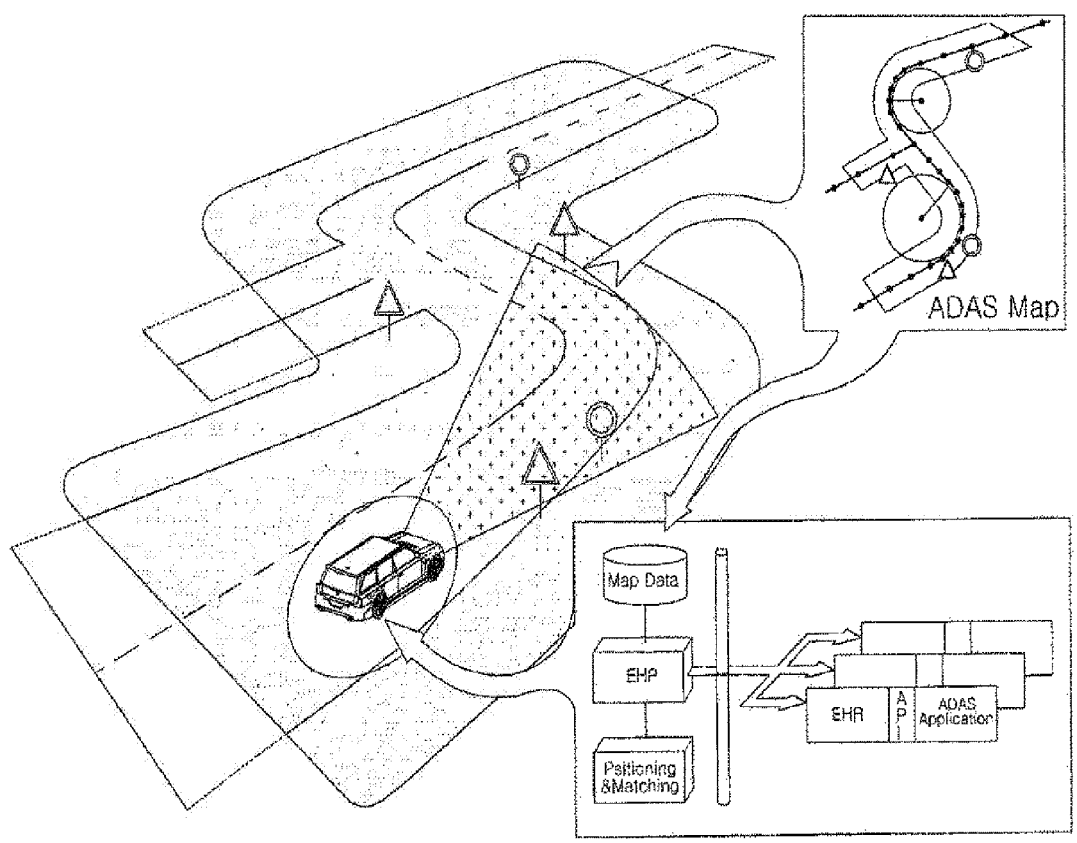
FIG. 1 is a diagram illustrating a vehicle traveling on a road according to an embodiment of the present disclosure.

Hereinafter, embodiments of the present disclosure will be described in detail with reference to the attached drawings. Like reference numerals denote the same or similar components throughout the drawings, and a redundant description of the same components will be avoided. The terms "module" and "unit", with which the names of components are suffixed, are assigned or used only in consideration of preparation of the specification, and may be interchanged with each other. The terms do not have any distinguishable meanings or roles. A detailed description of a related known technology will be omitted where it is determined that the same would obscure the subject matter of embodiments of the present disclosure. Further, the attached drawings are provided to help easy understanding of embodiments of the present disclosure, rather than to limit the scope and spirit of the present disclosure. Thus, it is to be understood that the present disclosure covers all modifications, equivalents, and alternatives falling within the scope and spirit of the present disclosure.

While ordinal numbers including "first", "second", etc. may be used to describe various components, they are not intended to limit the components. These expressions are used only to distinguish one component from another component.

When it is said that a component is "connected to" or "coupled to" another component, it should be understood that the one component may be connected or coupled to the other component directly or through some other component therebetween. On the other hand, when it is said that a component is "directly connected to" or "directly coupled to" another component, it should be understood that there is no other component between the components.

Singular forms include plural referents unless the context clearly dictates otherwise.

In the following description, the term "include" or "have" signifies the presence of a specific feature, number, step, operation, component, part, or combination thereof, but without excluding the presence or addition of one or more other features, numbers, steps, operations, components, parts, or combinations thereof.

In the following description, the left of a vehicle means the left when oriented in the forward traveling direction of the vehicle, and the right of a vehicle means the right when oriented in the forward traveling direction of the vehicle.

FIG. 1 is a diagram illustrating a vehicle traveling on a road according to an embodiment of the present disclosure.

Referring to FIG. 1, a vehicle 10 according to an embodiment of the present disclosure is defined as a transportation device that travels on a road or a railroad. The vehicle 10 conceptually includes an automobile, a train, and a motorcycle. Hereinafter, an autonomous vehicle, which travels without driving manipulation on the part of a driver, or a vehicle equipped with an advanced driver assistance system (ADAS) will be described as an example of the vehicle 10.

The vehicle described in the specification may conceptually include an internal combustion vehicle equipped with an engine as a power source, a hybrid vehicle equipped with an engine and an electric motor as power sources, and an electric vehicle equipped with an electric motor as a power source.

The vehicle 10 may include an electronic device 100. The electronic device 100 may be referred to as an electronic horizon provider (EHP). The electronic device 100 may be mounted in the vehicle 10, and may be electrically connected to other electronic devices provided in the vehicle 10.

Figure 2:
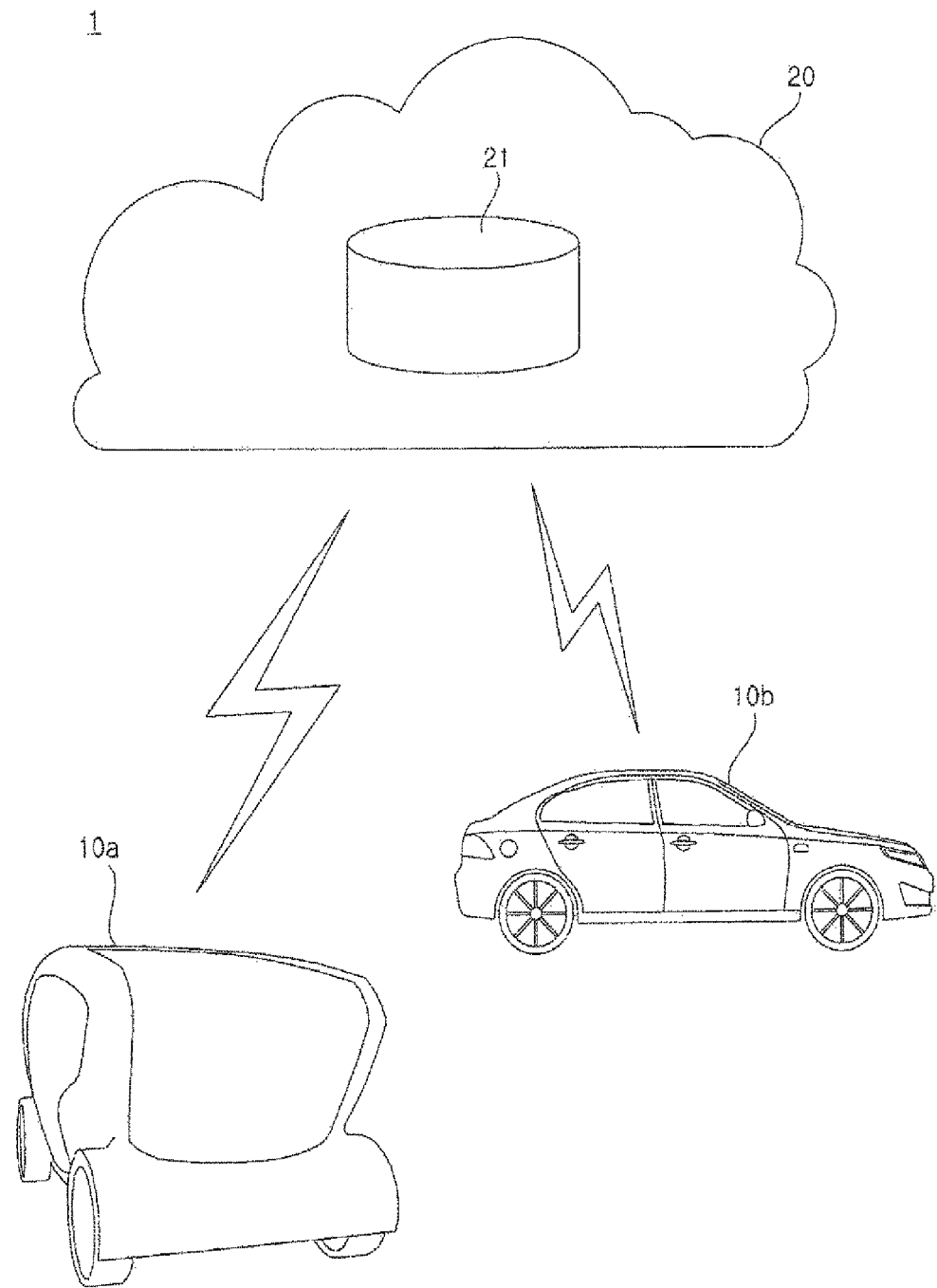
FIG. 2 is a diagram illustrating a system according to an embodiment of the present disclosure.

FIG. 2 is a diagram illustrating a system according to an embodiment of the present disclosure.

Referring to FIG. 2, the system 1 may include an infrastructure 20 and at least one vehicle 10a and 10b.

The infrastructure 20 may include at least one server 21. The server 21 may receive data generated by the vehicles 10a and 10b. The server 21 may process the received data. The server 21 may manage the received data.

The server 21 may receive data generated by at least one electronic device mounted in the vehicles 10a and 10b. For example, the server 21 may receive data generated by at least one of an EHP, a user interface device, an object detection device, a communication device, a driving operation device, a main ECU, a vehicle-driving device, a driving system, a sensing unit, or a location-data-generating device. The server 21 may generate big data based on data received from a plurality of vehicles. For example, the server 21 may receive dynamic data from the vehicles 10a and 10b, and may generate big data based on the received dynamic data. The server 21 may update HD map data based on data received from a plurality of vehicles. For example, the server 21 may receive data generated by the object detection device from the EHP included in the vehicles 10a and 10b, and may update HD map data.

The server 21 may provide pre-stored data to the vehicles 10a and 10b. For example, the server 21 may provide at least one of high-definition (HD) map data or standard-definition (SD) map data to the vehicles 10a and 10b. The server 21 may classify the map data on a per-section basis, and may provide only map data on the section requested from the vehicles 10a and 10b. The HD map data may be referred to as high-precision map data.

The server 21 may provide data processed or managed by the server 21 to the vehicles 10a and 10b. The vehicles 10a and 10b may generate a driving control signal based on the data received from the server 21. For example, the server 21 may provide HD map data to the vehicles 10a and 10b. For example, the server 21 may provide dynamic data to the vehicles 10a and 10b.

Figure 3:
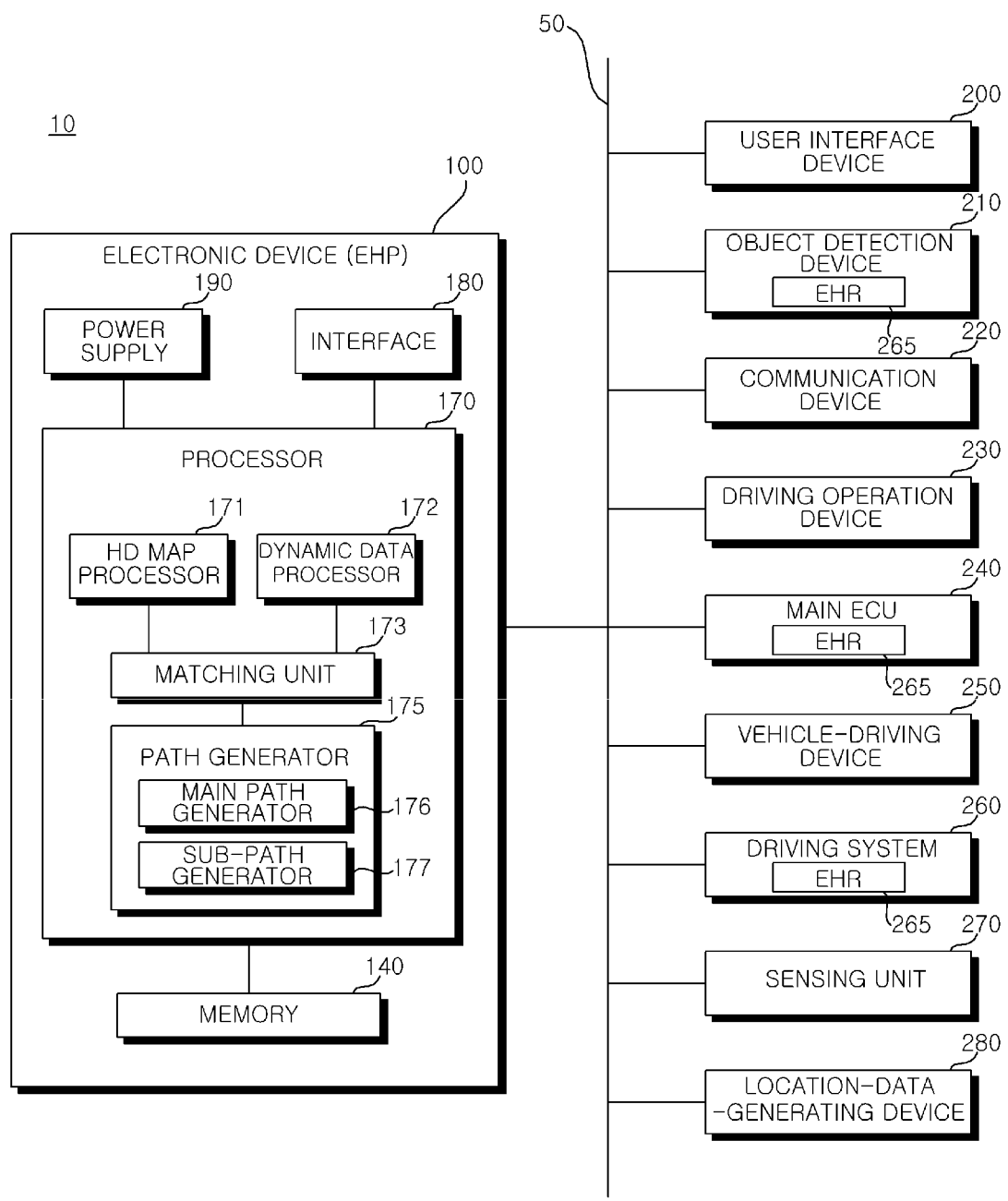
FIG. 3 is a diagram illustrating a vehicle including an electronic device according to an embodiment of the present disclosure.

FIG. 3 is a diagram illustrating a vehicle including an electronic device according to an embodiment of the present disclosure.

Figure 4:
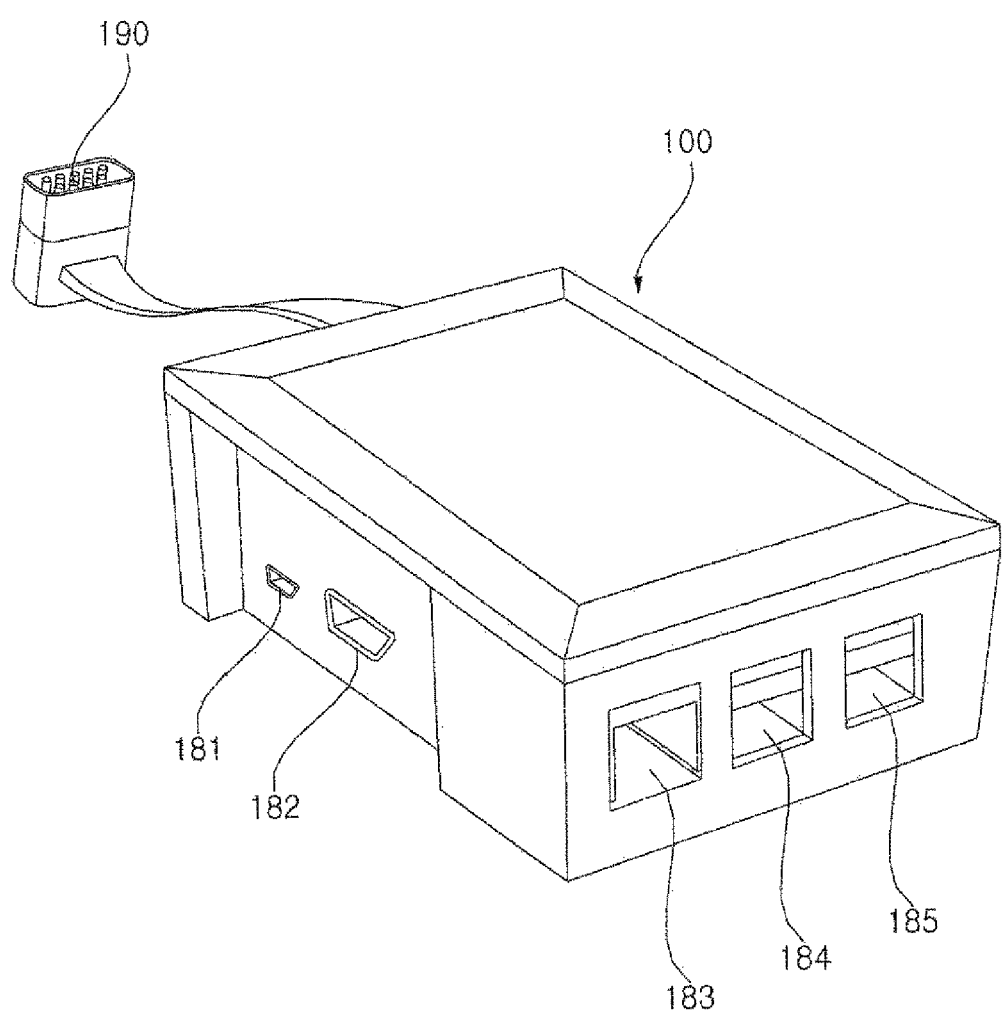
FIG. 4 illustrates the external appearance of an electronic device according to an embodiment of the present disclosure.

FIG. 4 illustrates the external appearance of an electronic device according to an embodiment of the present disclosure.

Referring to FIGS. 3 and 4, the vehicle 10 may include an electronic device 100, a user interface device 200, an object detection device 210, a communication device 220, a driving operation device 230, a main ECU 240, a vehicle-driving device 250, a driving system 260, a sensing unit 270, and a location-data-generating device 280.

The electronic device 100 may be referred to as an electronic horizon provider (EHP). The electronic device 100 may generate electronic horizon data, and may provide the electronic horizon data to at least one electronic device provided in the vehicle 10.

The electronic horizon data may be explained as driving plan data that is used when the driving system 260 generates a driving control signal of the vehicle 10. For example, the electronic horizon data may be understood as driving plan data within a range from a point at which the vehicle 10 is located to a horizon. Here, the horizon may be understood as a point a predetermined distance from the point at which the vehicle 10 is located along a predetermined traveling route. The horizon may refer to a point that the vehicle 10 reaches along a predetermined traveling route after a predetermined time period from the point at which the vehicle 10 is located. Here, the traveling route may refer to a traveling route to a final destination, and may be set through user input.

The electronic horizon data may include horizon map data and horizon path data.

The horizon map data may include at least one of topology data, ADAS data, HD map data, or dynamic data. According to an embodiment, the horizon map data may include a plurality of layers. For example, the horizon map data may include a first layer that matches the topology data, a second layer that matches the ADAS data, a third layer that matches the HD map data, and a fourth layer that matches the dynamic data. The horizon map data may further include static object data.

The topology data may be explained as a map created by connecting the centers of roads. The topology data may be suitable for schematic display of the location of a vehicle, and may primarily have a data form used for navigation for drivers. The topology data may be understood as data on road information excluding information about lanes. The topology data may be generated on the basis of data received by the infrastructure 20. The topology data may be based on data generated by the infrastructure 20. The topology data may be based on data stored in at least one memory provided in the vehicle 10.

The ADAS data may be data related to road information. The ADAS data may include at least one of road slope data, road curvature data, or road speed-limit data. The ADAS data may further include no-passing-zone data. The ADAS data may be based on data generated by the infrastructure 20. The ADAS data may be based on data generated by the object detection device 210. The ADAS data may be referred to as road information data.

The HD map data may include topology information in units of detailed lanes of roads, information on connections between respective lanes, and feature information for vehicle localization (e.g. traffic signs, lane marking/attributes, road furniture, etc.). The HD map data may be based on data generated by the infrastructure 20.

The dynamic data may include various types of dynamic information that can be generated on roads. For example, the dynamic data may include construction information, variable-speed road information, road condition information, traffic information, moving object information, etc. The dynamic data may be based on data received by the infrastructure 20. The dynamic data may be based on data generated by the object detection device 210.

The electronic device 100 may provide map data within a range from the point at which the vehicle 10 is located to the horizon.

The horizon path data may be explained as a trajectory that the vehicle 10 can take within a range from the point at which the vehicle 10 is located to the horizon. The horizon path data may include data indicating the relative probability of selecting one road at a decision point (e.g. a fork, a junction, an intersection, etc.). The relative probability may be calculated on the basis of the time taken to arrive at a final destination. For example, if the time taken to arrive at a final destination is shorter when a first road is selected at a decision point than that when a second road is selected, the probability of selecting the first road may be calculated to be higher than the probability of selecting the second road.

The horizon path data may include a main path and a sub-path. The main path may be understood as a trajectory obtained by connecting roads having a high relative probability of being selected. The sub-path may branch from at least one decision point on the main path. The sub-path may be understood as a trajectory obtained by connecting at least one road having a low relative probability of being selected at at least one decision point on the main path.

The electronic device 100 may include an interface 180, a power supply 190, a memory 140, and a processor 170.

The interface 180 may exchange signals with at least one electronic device provided in the vehicle 10 in a wired or wireless manner. The interface 180 may exchange signals with at least one of the user interface device 200, the object detection device 210, the communication device 220, the driving operation device 230, the main ECU 240, the vehicle-driving device 250, the driving system 260, the sensing unit 270, or the location-data-generating device 280 in a wired or wireless manner. The interface 180 may be configured as at least one of a communication module, a terminal, a pin, a cable, a port, a circuit, an element, or a device.

The power supply 190 may provide power to the electronic device 100. The power supply 190 may receive power from a power source (e.g. a battery) included in the vehicle 10, and may supply the power to each unit of the electronic device 100. The power supply 190 may be operated in response to a control signal provided from the main ECU 240. The power supply 190 may be implemented as a switched-mode power supply (SMPS).

The memory 140 is electrically connected to the processor 170. The memory 140 may store basic data on units, control data for operation control of units, and input/output data. The memory 140 may store data processed by the processor 170. Hardware-wise, the memory 140 may be configured as at least one of ROM, RAM, EPROM, a flash drive, or a hard drive. The memory 140 may store various types of data for the overall operation of the electronic device 100, such as a program for processing or control of the processor 170. The memory 140 may be integrated with the processor 170.

The processor 170 may be electrically connected to the interface 180 and the power supply 190, and may exchange signals therewith. The processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or electrical units for executing other functions.

The processor 170 may be driven by power provided from the power supply 190. The processor 170 may continuously generate electronic horizon data while receiving power from the power supply 190.

The processor 170 may generate electronic horizon data. The processor 170 may generate electronic horizon data. The processor 170 may generate horizon path data.

The processor 170 may generate electronic horizon data in consideration of the driving situation of the vehicle 10. For example, the processor 170 may generate electronic horizon data on the basis of the driving direction data and the driving speed data of the vehicle 10.

The processor 170 may combine the generated electronic horizon data with the previously generated electronic horizon data. For example, the processor 170 may positionally connect horizon map data generated at a first time point to horizon map data generated at a second time point. For example, the processor 170 may positionally connect horizon path data generated at a first time point to horizon path data generated at a second time point.

The processor 170 may provide electronic horizon data. The processor 170 may provide electronic horizon data to at least one of the driving system 260 or the main ECU 240 through the interface 180.

The processor 170 may include a memory 140, an HD map processor 171, a dynamic data processor 172, a matching unit 173, and a path generator 175.

The HD map processor 171 may receive HD map data from the server 21 through the communication device 220. The HD map processor 171 may store HD map data. According to an embodiment, the HD map processor 171 may process and manage HD map data.

The dynamic data processor 172 may receive dynamic data from the object detection device 210. The dynamic data processor 172 may receive dynamic data from the server 21. The dynamic data processor 172 may store dynamic data. According to an embodiment, the dynamic data processor 172 may process and manage dynamic data.

The matching unit 173 may receive an HD map from the HD map processor 171. The matching unit 173 may receive dynamic data from the dynamic data processor 172. The matching unit 173 may match HD map data and dynamic data to generate horizon map data.

According to an embodiment, the matching unit 173 may receive topology data. The matching unit 173 may receive ADAS data. The matching unit 173 may match topology data, ADAS data, HD map data, and dynamic data to generate horizon map data.

The path generator 175 may generate horizon path data. The path generator 175 may include a main path generator 176 and a sub-path generator 177. The main path generator 176 may generate main path data. The sub-path generator 177 may generate sub-path data.

The electronic device 100 may include at least one printed circuit board (PCB). The interface 180, the power supply 190, and the processor 170 may be electrically connected to the printed circuit board.

Meanwhile, according to an embodiment, the electronic device 100 may be integrally formed with the communication device 220. In this case, the communication device 220 may be included as a lower-level component of the electronic device 100.

The user interface device 200 is a device used to allow the vehicle 10 to communicate with a user. The user interface device 200 may receive user input, and may provide information generated by the vehicle 10 to the user. The vehicle 10 may implement User Interfaces (UIs) or a User Experience (UX) through the user interface device 200.

The object detection device 210 may detect objects outside the vehicle 10. The object detection device 210 may include at least one of a camera, a radar, a lidar, an ultrasonic sensor, or an infrared sensor. The object detection device 210 may provide data on an object, generated on the basis of a sensing signal generated by the sensor, to at least one electronic device included in the vehicle.

The object detection device 210 may generate dynamic data on the basis of a sensing signal with respect to an object. The object detection device 210 may provide the dynamic data to the electronic device 100.

The object detection device 210 may receive electronic horizon data. The object detection device 210 may include an electronic horizon re-constructor (EHR) 265. The EHR 265 may convert the electronic horizon data into a data format that can be used in the object detection device 210.

The communication device 220 may exchange signals with a device located outside the vehicle 10. The communication device 220 may exchange signals with at least one of an infrastructure (e.g. a server) or another vehicle. In order to implement communication, the communication device 220 may include at least one of a transmission antenna, a reception antenna, a Radio-Frequency (RF) circuit capable of implementing various communication protocols, or an RF device.

The driving operation device 230 is a device that receives user input for driving the vehicle. In the manual mode, the vehicle 10 may be driven in response to a signal provided by the driving operation device 230. The driving operation device 230 may include a steering input device (e.g. a steering wheel), an acceleration input device (e.g. an accelerator pedal), and a brake input device (e.g. a brake pedal).

The main electronic control unit (ECU) 240 may control the overall operation of at least one electronic device provided in the vehicle 10.

The main ECU 240 may receive electronic horizon data. The main ECU 240 may include an electronic horizon re-constructor (EHR) 265. The EHR 265 may convert the electronic horizon data into a data format that can be used in the main ECU 240.

The vehicle-driving device 250 is a device that electrically controls the operation of various devices provided in the vehicle 10. The vehicle-driving device 250 may include a powertrain-driving unit, a chassis-driving unit, a door/window-driving unit, a safety-device-driving unit, a lamp-driving unit, and an air-conditioner-driving unit. The powertrain-driving unit may include a power-source-driving unit and a transmission-driving unit. The chassis-driving unit may include a steering-driving unit, a brake-driving unit, and a suspension-driving unit.

The driving system 260 may perform the driving operation of the vehicle 10. The driving system 260 may provide a control signal to at least one of the powertrain-driving unit or the chassis-driving unit of the vehicle-driving device 250 to drive the vehicle 10.

The driving system 260 may receive electronic horizon data. The driving system 260 may include an electronic horizon re-constructor (EHR) 265. The EHR 265 may convert the electronic horizon data into a data format that can be used in an ADAS application and an autonomous driving application.

The driving system 260 may include at least one of an ADAS application and an autonomous driving application. The driving system 260 may generate a driving control signal using at least one of the ADAS application or the autonomous driving application.

The sensing unit 270 may sense the state of the vehicle. The sensing unit 270 may include at least one of an inertial navigation unit (IMU) sensor, a collision sensor, a wheel sensor, a speed sensor, an inclination sensor, a weight detection sensor, a heading sensor, a position module, a vehicle forward/reverse movement sensor, a battery sensor, a fuel sensor, a tire sensor, a steering sensor for detecting rotation of the steering wheel, a vehicle internal temperature sensor, a vehicle internal humidity sensor, an ultrasonic sensor, an illuminance sensor, an accelerator pedal position sensor, or a brake pedal position sensor. The inertial navigation unit (IMU) sensor may include at least one of an acceleration sensor, a gyro sensor, or a magnetic sensor.

The sensing unit 270 may generate data on the state of the vehicle based on the signal generated by at least one sensor. The sensing unit 270 may obtain sensing signals of vehicle attitude information, vehicle motion information, vehicle yaw information, vehicle roll information, vehicle pitch information, vehicle collision information, vehicle heading information, vehicle angle information, vehicle speed information, vehicle acceleration information, vehicle inclination information, vehicle forward/reverse movement information, battery information, fuel information, tire information, vehicle lamp information, vehicle internal temperature information, vehicle internal humidity information, a steering wheel rotation angle, vehicle external illuminance, the pressure applied to the accelerator pedal, the pressure applied to the brake pedal, etc.

In addition, the sensing unit 270 may further include an accelerator pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), etc.

The sensing unit 270 may generate vehicle state information on the basis of sensing data. The vehicle state information may be information generated on the basis of data sensed by various sensors provided in the vehicle.

For example, the vehicle state information may include vehicle posture information, vehicle speed information, vehicle inclination information, vehicle weight information, vehicle heading information, vehicle battery information, vehicle fuel information, vehicle tire air pressure information, vehicle steering information, vehicle internal temperature information, vehicle internal humidity information, pedal position information, vehicle engine temperature information, etc.

The location-data-generating device 280 may generate location data of the vehicle 10. The location-data-generating device 280 may include at least one of a global positioning system (GPS) or a differential global positioning system (DGPS). The location-data-generating device 280 may generate data on the location of the vehicle 10 based on a signal generated by at least one of the GPS or the DGPS. According to an embodiment, the location-data-generating device 280 may correct the location data based on at least one of the inertial measurement unit (IMU) of the sensing unit 270 or the camera of the object detection device 210.

Figure 5A:
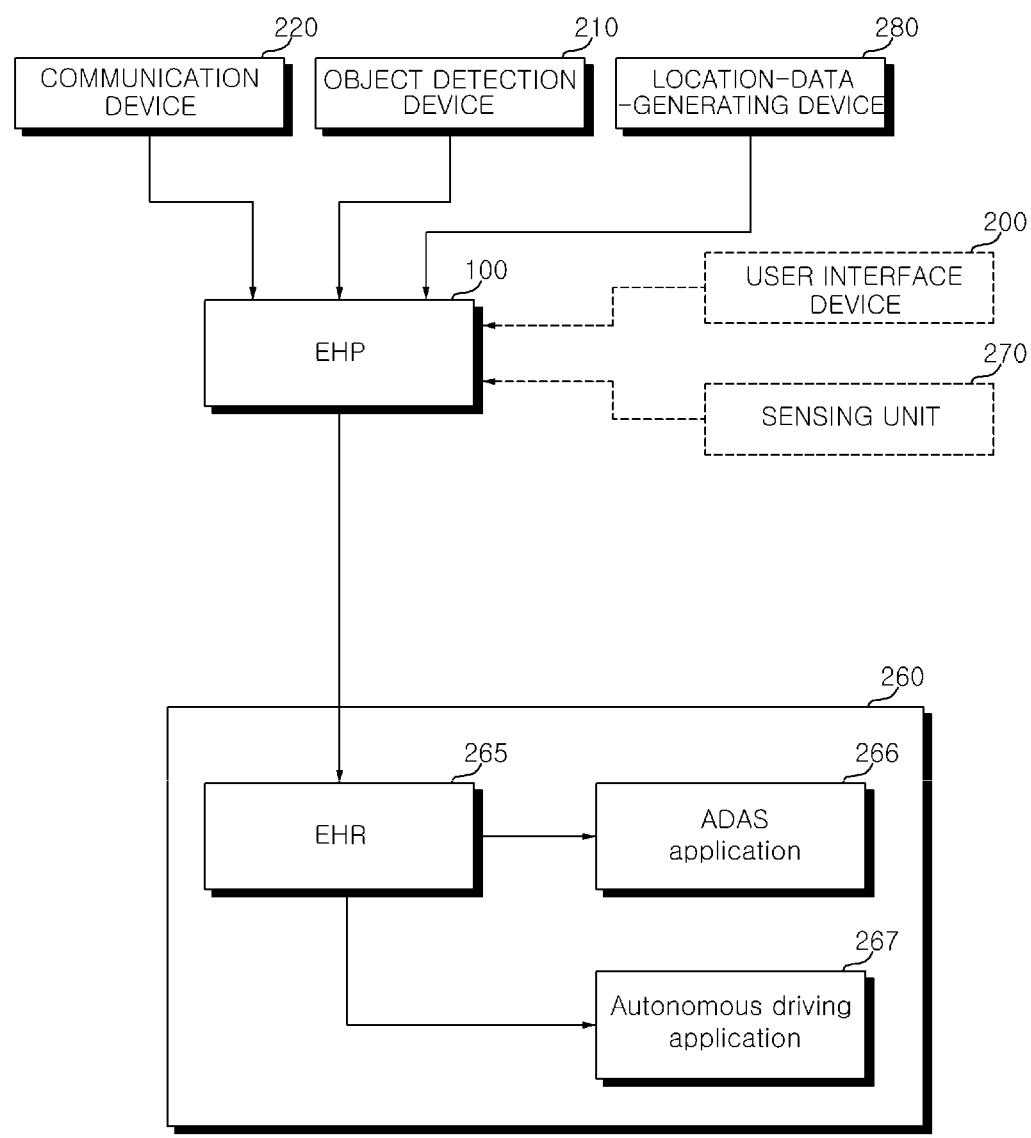
FIGS. 5A to 5C are signal flow diagrams of a vehicle including an electronic device according to an embodiment of the present disclosure.

The vehicle 10 may include an internal communication system 50. The plurality of electronic devices included in the vehicle 10 may exchange signals via the internal communication system 50. Data may be included in signals. The internal communication system 50 may use at least one communication protocol (e.g. CAN, LIN, FlexRay, MOST, and Ethernet). FIG. 5A is a signal flow diagram of the vehicle including an electronic device according to an embodiment of the present disclosure.

Referring to FIG. 5A, the electronic device 100 may receive HD map data from the server 21 through the communication device 220.

The electronic device 100 may receive dynamic data from the object detection device 210. According to an embodiment, the electronic device 100 may receive dynamic data from the server 21 through the communication device 220.

The electronic device 100 may receive the location data of the vehicle from the location-data-generating device 280.

According to an embodiment, the electronic device 100 may receive a signal based on user input through the user interface device 200. According to an embodiment, the electronic device 100 may receive vehicle state information from the sensing unit 270.

The electronic device 100 may generate electronic horizon data based on HD map data, dynamic data, and location data. The electronic device 100 may match the HD map data, the dynamic data, and the location data to generate horizon map data. The electronic device 100 may generate horizon path data on the horizon map. The electronic device 100 may generate main path data and sub-path data on the horizon map.

The electronic device 100 may provide electronic horizon data to the driving system 260. The EHR 265 of the driving system 260 may convert the electronic horizon data into a data format that is suitable for the applications 266 and 267. The applications 266 and 267 may generate a driving control signal based on the electronic horizon data. The driving system 260 may provide the driving control signal to the vehicle-driving device 250.

The driving system 260 may include at least one of the ADAS application 266 or the autonomous driving application 267. The ADAS application 266 may generate a control signal for assisting the driver in driving the vehicle 10 through the driving operation device 230 based on the electronic horizon data. The autonomous driving application 267 may generate a control signal for enabling movement of the vehicle 10 based on the electronic horizon data.

Figure 5B:
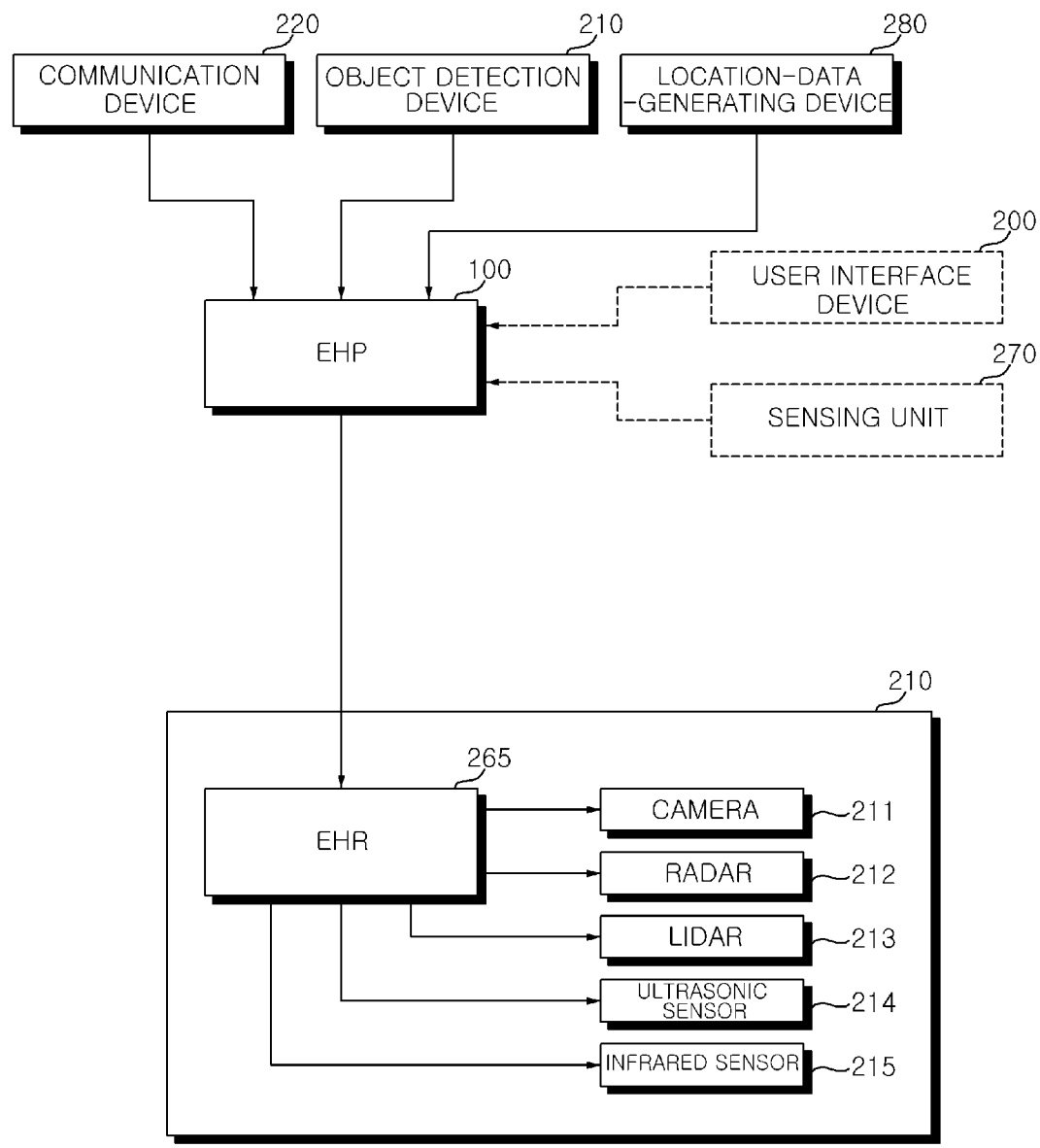

FIG. 5B is a signal flow diagram of the vehicle including an electronic device according to an embodiment of the present disclosure.

The difference from FIG. 5A will be mainly described with reference to FIG. 5B. The electronic device 100 may provide electronic horizon data to the object detection device 210. The EHR 265 of the object detection device 210 may convert the electronic horizon data into a data format that is suitable for the object detection device 210. The object detection device 210 may include at least one of a camera 211, a radar 212, a lidar 213, an ultrasonic sensor 214, or an infrared sensor 215. The electronic horizon data, the data format of which has been converted by the EHR 265, may be provided to at least one of the camera 211, the radar 212, the lidar 213, the ultrasonic sensor 214, or the infrared sensor 215. At least one of the camera 211, the radar 212, the lidar 213, the ultrasonic sensor 214, or the infrared sensor 215 may generate data based on the electronic horizon data.

Figure 5C:
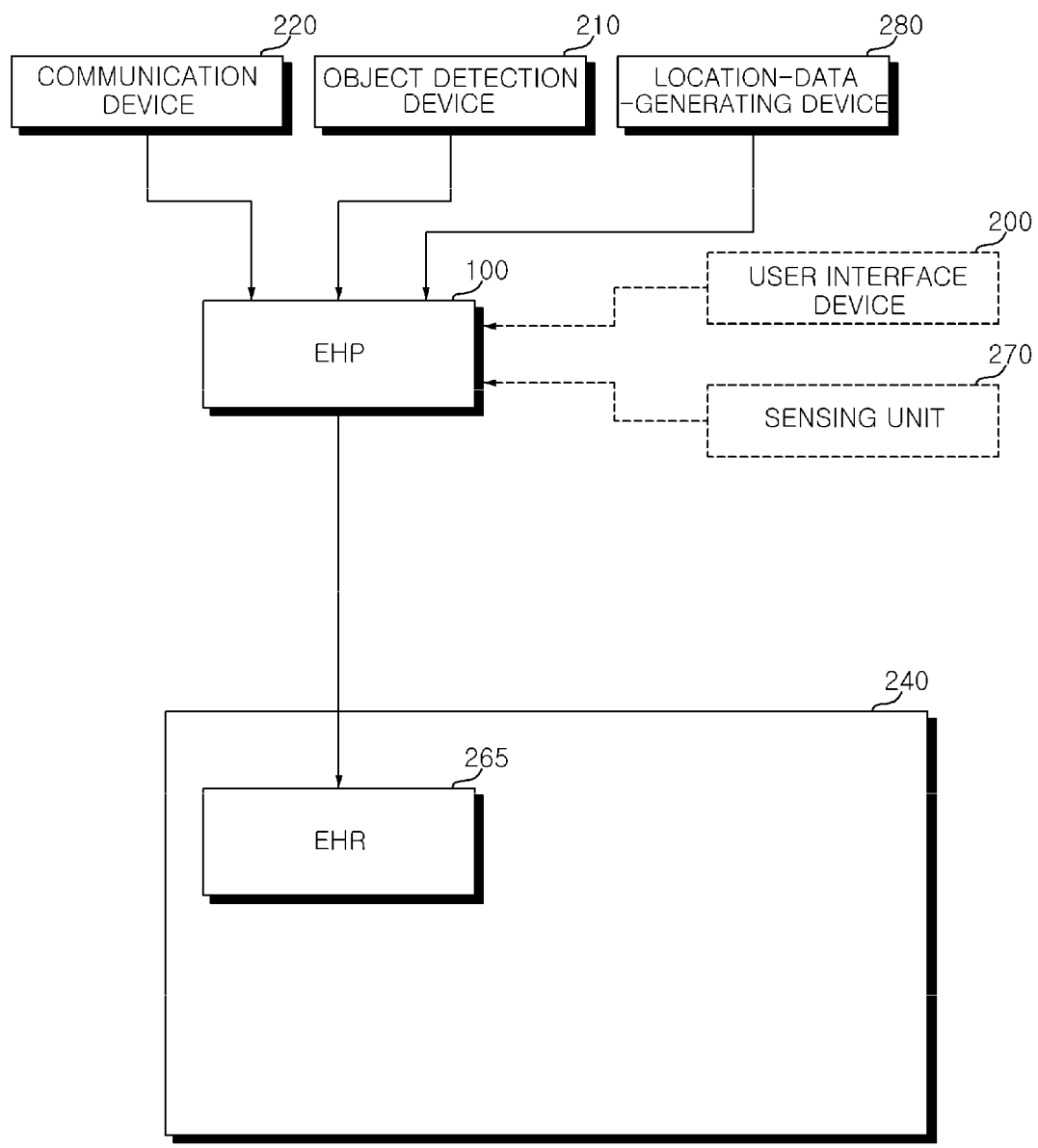

FIG. 5C is a signal flow diagram of the vehicle including an electronic device according to an embodiment of the present disclosure.

The difference from FIG. 5A will be mainly described with reference to FIG. 5C. The electronic device 100 may provide electronic horizon data to the main ECU 240. The EHR 265 of the main ECU 240 may convert the electronic horizon data into a data format that is suitable for the main ECU 240. The main ECU 240 may generate a control signal based on the electronic horizon data. For example, the main ECU 240 may generate a control signal for controlling at least one of the user interface device 180, the object detection device 210, the communication device 220, the driving operation device 230, the vehicle-driving device 250, the driving system 260, the sensing unit 270, or the location-data-generating device 280 based on the electronic horizon data.

Figure 6A:
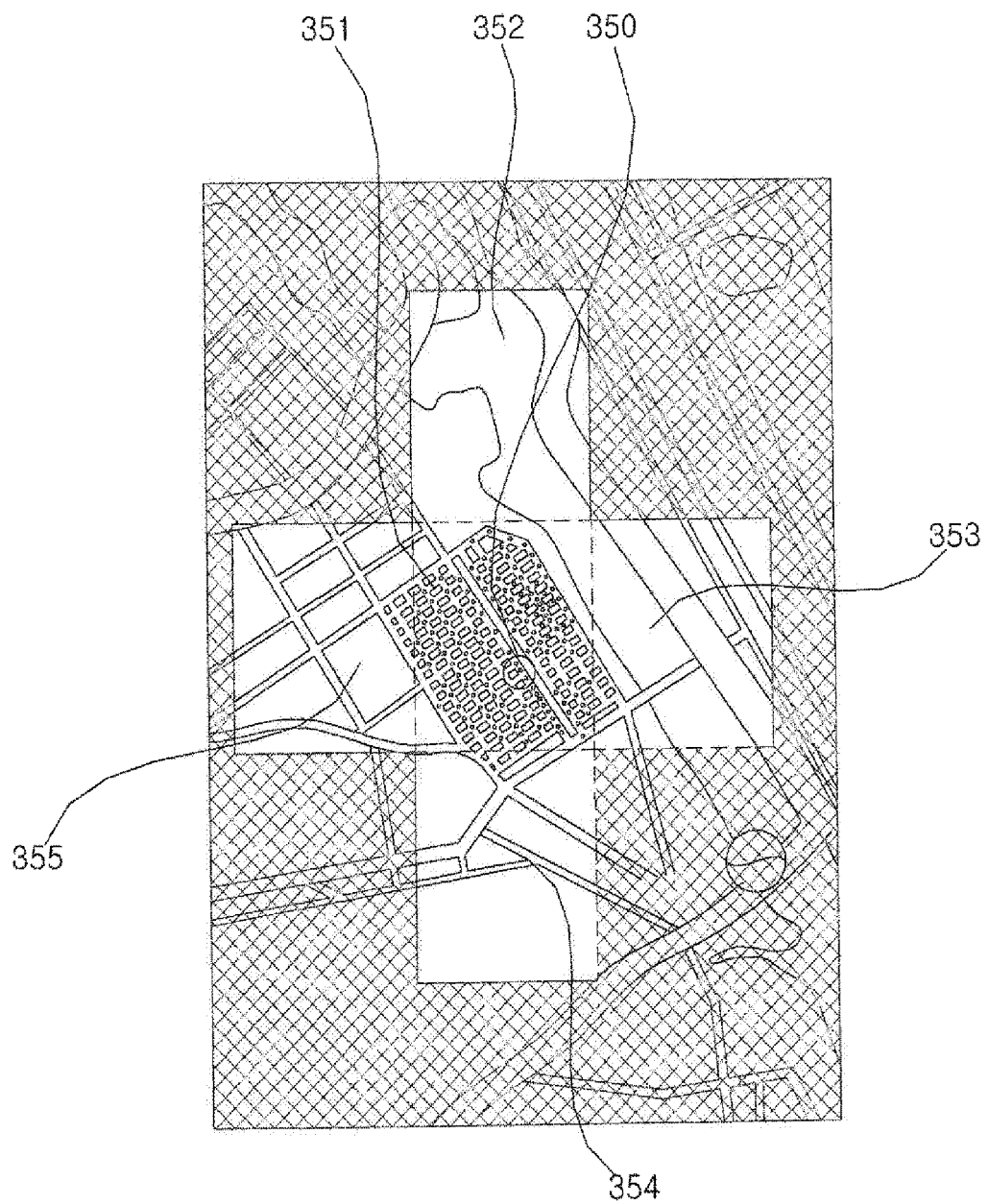
FIGS. 6A and 6B are diagrams illustrating the operation of receiving HD map data according to an embodiment of the present disclosure.
Figure 6B:
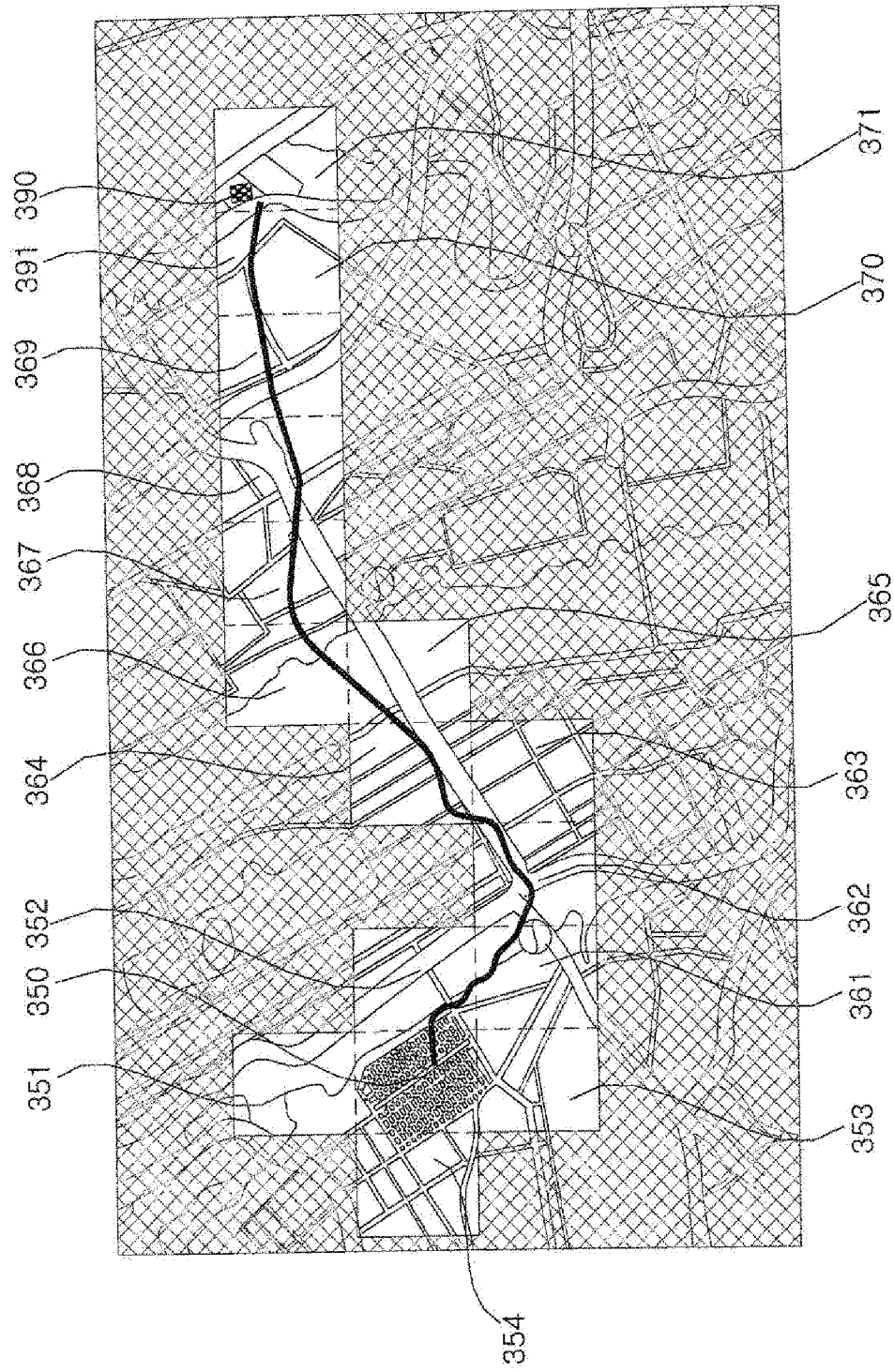

FIGS. 6A and 6B are diagrams illustrating the operation of receiving HD map data according to an embodiment of the present disclosure.

The server 21 may classify HD map data in units of HD map tiles, and may provide the same to the electronic device 100. The processor 170 may download HD map data from the server 21 in units of HD map tiles through the communication device 220.

The HD map tiles may be defined as sub-HD map data obtained by geographically sectioning the entire HD map in a rectangular shape. The entire HD map data may be obtained by connecting all of the HD map tiles. Since the HD map data is voluminous data, a high-performance controller is required for the vehicle 10 in order to download the entire HD map data to the vehicle 10 to use the same. With the development of communication technology, efficient data processing is possible by downloading, using, and deleting HD map data in the form of HD map tiles, rather than installing a high-performance controller in the vehicle 10.

The processor 170 may store the downloaded HD map tiles in the memory 140. The processor 170 may delete the stored HD map tiles. For example, when the vehicle 10 moves out of an area corresponding to an HD map tile, the processor 170 may delete the HD map tile. For example, when a predetermined time period elapses after an HD map tile is stored, the processor 170 may delete the HD map tile.

FIG. 6A is a diagram illustrating the operation of receiving HD map data when there is no preset destination.

Referring to FIG. 6A, when there is no preset destination, the processor 170 may receive a first HD map tile 351 including the location 350 of the vehicle 10. The server 21 may receive data on the location 350 of the vehicle 10 from the vehicle 10, and may provide the first HD map tile 351 including the location 250 of the vehicle 10 to the vehicle 10. In addition, the processor 170 may receive HD map tiles 352, 353, 354 and 355 surrounding the first HD map tile 351. For example, the processor 170 may receive HD map tiles 352, 353, 354 and 355, which are adjacent to and respectively located above, below, and to the left and right of the first HD map tile 351. In this case, the processor 170 may receive a total of five HD map tiles. For example, the processor 170 may further receive HD map tiles located in a diagonal direction, together with the HD map tiles 352, 353, 354 and 355, which are adjacent to and respectively located above, below, and to the left and right of the first HD map tile 351. In this case, the processor 170 may receive a total of nine HD map tiles.

FIG. 6B is a diagram illustrating the operation of receiving HD map data when there is a preset destination.

Referring to FIG. 6B, when there is a preset destination, the processor 170 may receive tiles 350, 352, 361, 362, 363, 364, 365, 366, 367, 368, 369, 370 and 371, which are associated with a route 391 from the location 350 of the vehicle 10 to the destination. The processor 170 may receive a plurality of tiles 350, 352, 361, 362, 363, 364, 365, 366, 367, 368, 369, 370 and 371 so as to cover the route 391.

The processor 170 may receive all of the tiles 350, 352, 361, 362, 363, 364, 365, 366, 367, 368, 369, 370 and 371, which cover the route 391, at the same time.

Alternatively, while the vehicle 10 is moving along the route 391, the processor 170 may sequentially receive the tiles 350, 352, 361, 362, 363, 364, 365, 366, 367, 368, 369, 370 and 371 at two or more times. While the vehicle 10 is moving along the route 391, the processor 170 may receive only some of the tiles 350, 352, 361, 362, 363, 364, 365, 366, 367, 368, 369, 370 and 371 on the basis of the location of the vehicle 10. Thereafter, the processor 170 may continuously receive the tiles during the movement of the vehicle 10, and may delete the previously received tiles.

Figure 6C:
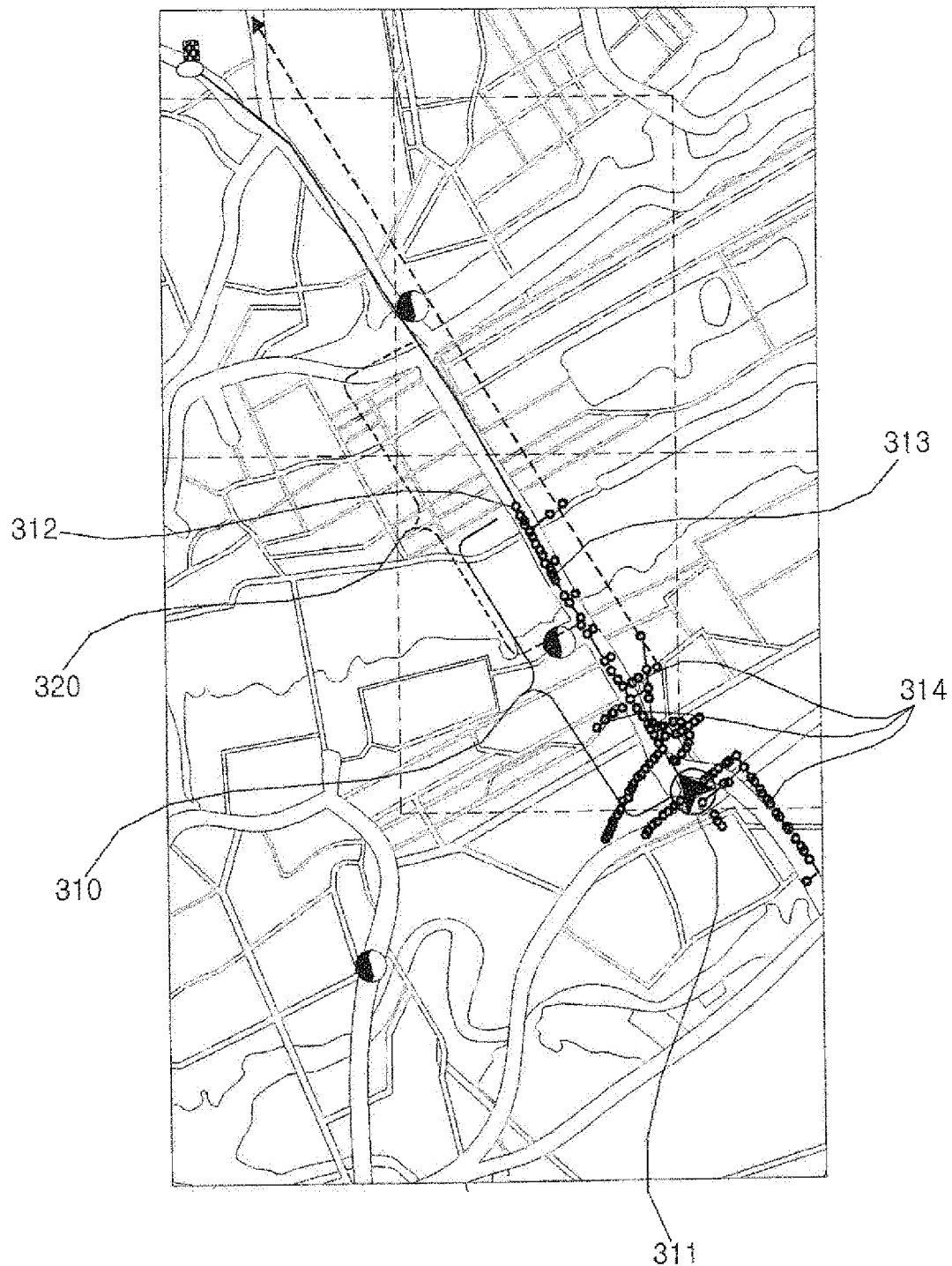
FIG. 6C is a diagram illustrating the operation of generating electronic horizon data according to an embodiment of the present disclosure.

FIG. 6C is a diagram illustrating the operation of generating electronic horizon data according to an embodiment of the present disclosure.

Referring to FIG. 6C, the processor 170 may generate electronic horizon data on the basis of HD map data.

The vehicle 10 may be driven in the state in which the final destination is set. The final destination may be set based on user input received through the user interface device 200 or the communication device 220. According to an embodiment, the final destination may be set by the driving system 260.

In the state in which the final destination is set, the vehicle 10 may be located within a predetermined distance from a first point while traveling. When the vehicle 10 is located within a predetermined distance from the first point, the processor 170 may generate electronic horizon data having the first point as a starting point and a second point as an ending point. The first point and the second point may be points on the route to the final destination. The first point may be explained as a point at which the vehicle 10 is located or is to be located in the near future. The second point may be explained as the horizon described above.

The processor 170 may receive an HD map of an area including the section from the first point to the second point. For example, the processor 170 may request and receive an HD map of an area within a predetermined radius from the section from the first point to the second point.

The processor 170 may generate electronic horizon data on the area including the section from the first point to the second point on the basis of the HD map. The processor 170 may generate horizon map data on the area including the section from the first point to the second point. The processor 170 may generate horizon path data on the area including the section from the first point to the second point. The processor 170 may generate data on a main path 313 in the area including the section from the first point to the second point. The processor 170 may generate a sub-path 314 in the area including the section from the first point to the second point.

When the vehicle 10 is located within a predetermined distance from the second point, the processor 170 may generate electronic horizon data having the second point as a starting point and a third point as an ending point. The second point and the third point may be points on the route to the final destination. The second point may be explained as a point at which the vehicle 10 is located or is to be located in the near future. The third point may be explained as the horizon described above. Meanwhile, the electronic horizon data having the second point as a starting point and the third point as an ending point may be geographically connected to the above-described electronic horizon data having the first point as a starting point and the second point as an ending point.

The operation of generating the electronic horizon data having the first point as a starting point and the second point as an ending point may be applied to the operation of generating the electronic horizon data having the second point as a starting point and the third point as an ending point.

According to an embodiment, the vehicle 10 may be driven even when a final destination is not set.

Figure 7:
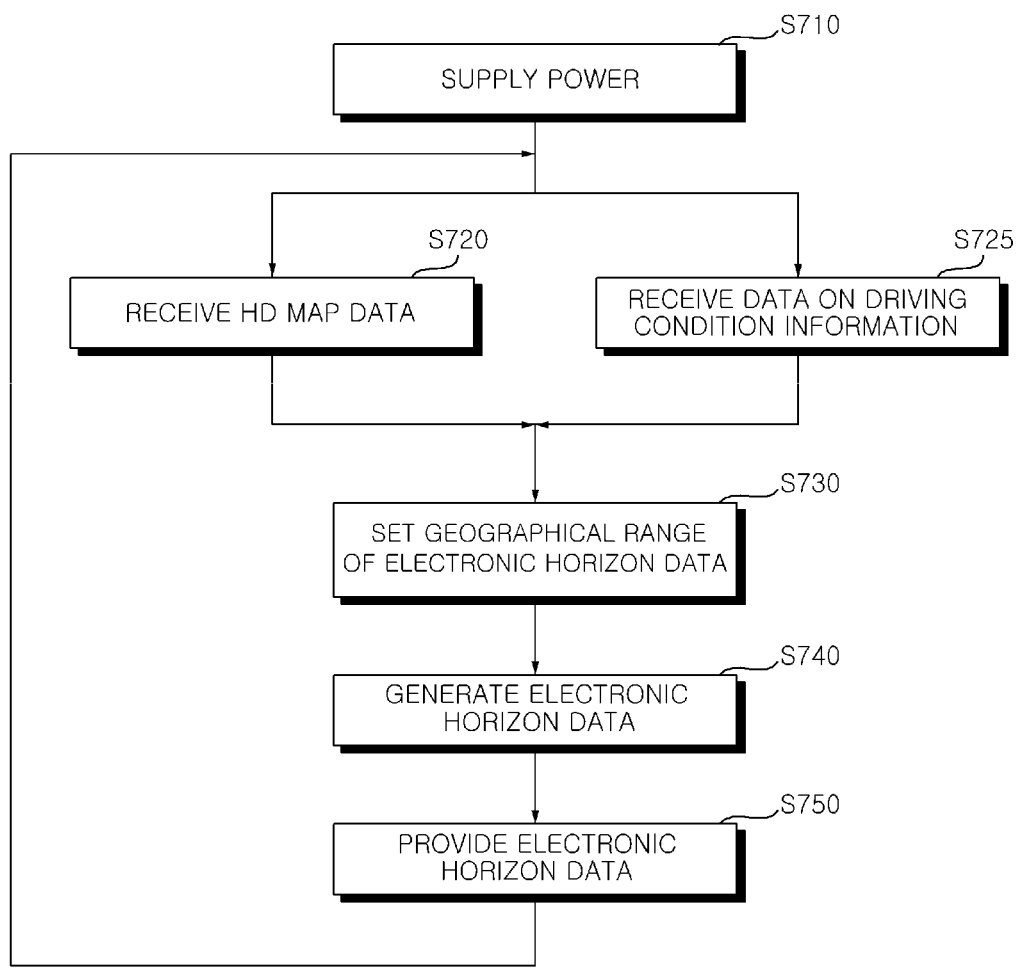
FIG. 7 is a flowchart of an electronic device according to an embodiment of the present disclosure.

FIG. 7 is a flowchart of an electronic device according to an embodiment of the present disclosure.

Referring to FIG. 7, the processor 170 may receive power through the power supply 190 (S710). The power supply 190 may supply power to the processor 170. When the vehicle 10 is turned on, the processor 170 may receive power supplied from the battery provided in the vehicle 10 through the power supply 190. The processor 170 may perform a processing operation when receiving power.

The processor 170 may receive HD map data through the interface 180 (S720). While the vehicle 10 is traveling, the interface 180 may receive HD map data on a specific geographic area from the server 21 through the communication device 220. The interface 180 may receive HD map data on an area around the location of the vehicle 10. The interface 180 may transmit the received HD map data to the processor 170.

The processor 170 may receive data on driving condition information through the interface 180 (S725). The interface 180 may receive data on driving condition information of the vehicle 10. The driving condition information may include sensing range information of at least one sensor included in the object detection device (210 of FIG. 3). The driving condition information may include driving speed information of the vehicle 10. The driving condition information may include traffic volume information. The interface 180 may transmit data on driving condition information to the processor 170.

The processor 170 may set the geographical range of the electronic horizon data based on data on the driving condition information (S730). The electronic horizon data may include horizon map data and horizon path data. The horizon path data may include data on a main path, which is defined as a trajectory obtained by connecting roads having a high relative probability of being selected, and data on a sub-path, which branches from at least one decision point on the main path.

The processor 170 may set the geographical range of the electronic horizon data based on data on the sensing range information of at least one sensor included in the object detection device (210 of FIG. 3). The setting step (S730) may include a step of setting, by the processor 170, a geographical range of the electronic horizon data such that the geographical range corresponds to the sensing range of the at least one sensor.

The processor 170 may set the geographical range of the electronic horizon data based on data on the driving speed information of the vehicle. The setting step (S730) may include, when it is determined that the driving speed of the vehicle 10 is decreasing, a step of reducing, by the processor 170, the geographical range of the main path in the traveling direction of the vehicle 10 and increasing the geographical range of the sub-path in the leftward-rightward direction of the vehicle 10.

The processor 170 may set the geographical range of the electronic horizon data based on data on the traffic volume information. The setting step (S730) may include, when it is determined that the traffic volume is increasing, a step of reducing, by the processor 170, the geographical range of the main path in the traveling direction of the vehicle 10 and increasing the geographical range of the sub-path in the leftward-rightward direction of the vehicle 10.

The processor 170 may generate electronic horizon data on a specific area based on HD map data (S740). The processor 170 may generate electronic horizon data corresponding to the set geographical range based on the HD map data.

The processor 170 may provide the electronic horizon data to the driving system 260 through the interface 180 (S750). The processor 170 may provide electronic horizon data corresponding to the set geographical range to the driving system 260 through the interface 180. Thereafter, the processor 170 may repeatedly perform steps subsequent to steps S720 and S725.

Meanwhile, steps S720 to S750 may be performed in the state of receiving power from the power supply 190.

Figure 8:
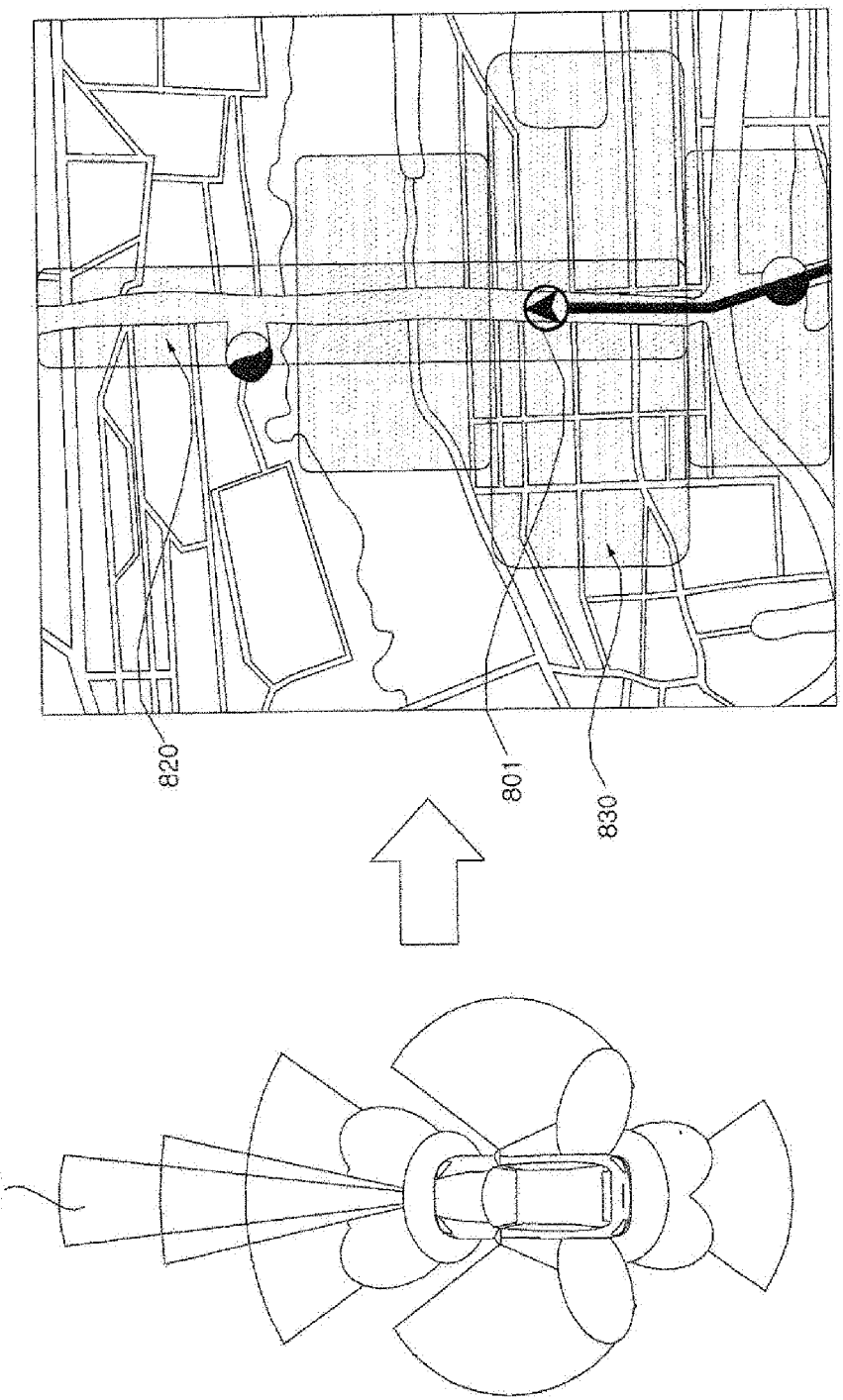
FIGS. 8 to 10 are diagrams illustrating the operation of an electronic device according to an embodiment of the present disclosure.
Figure 9:
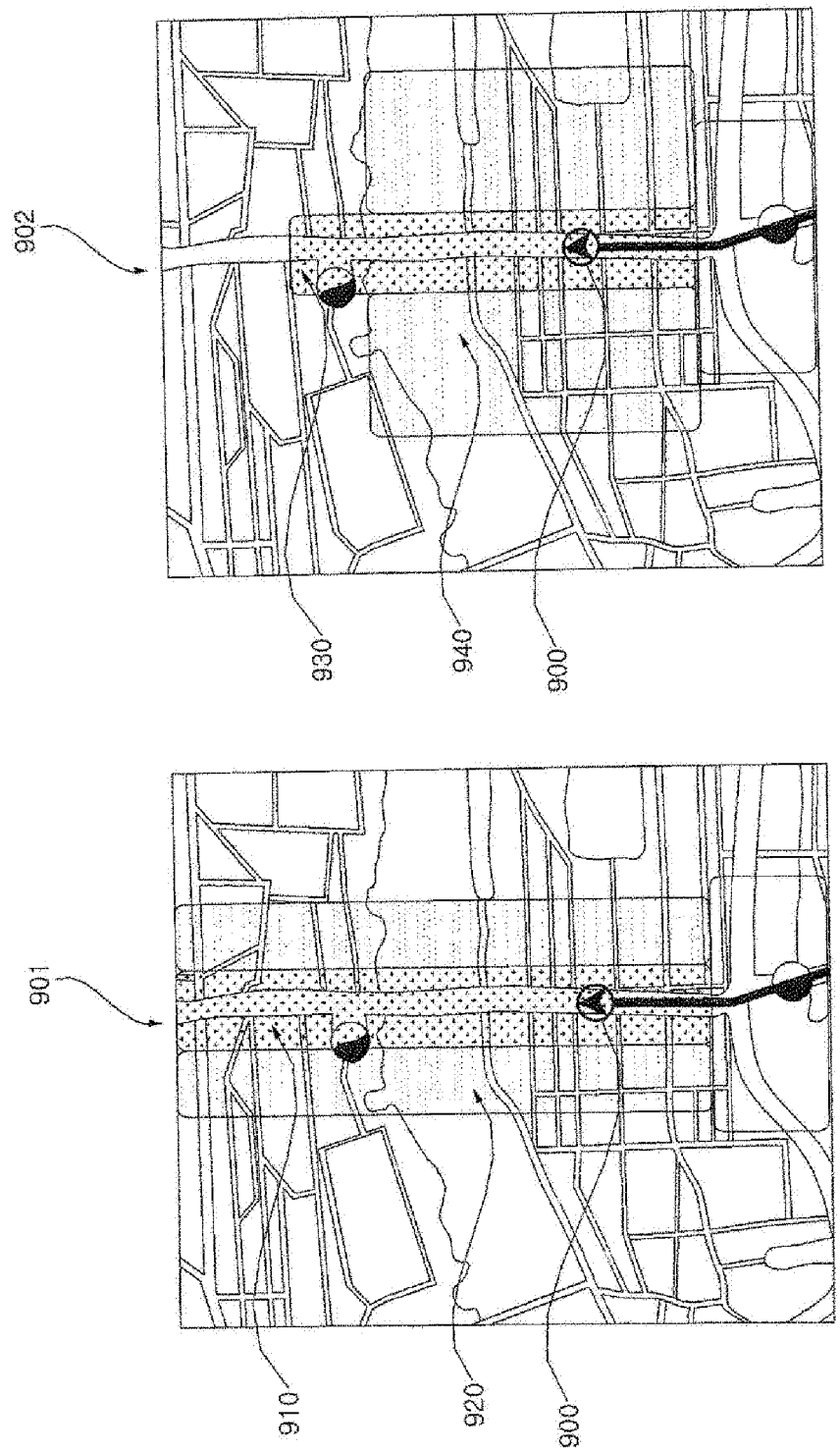
Figure 10:
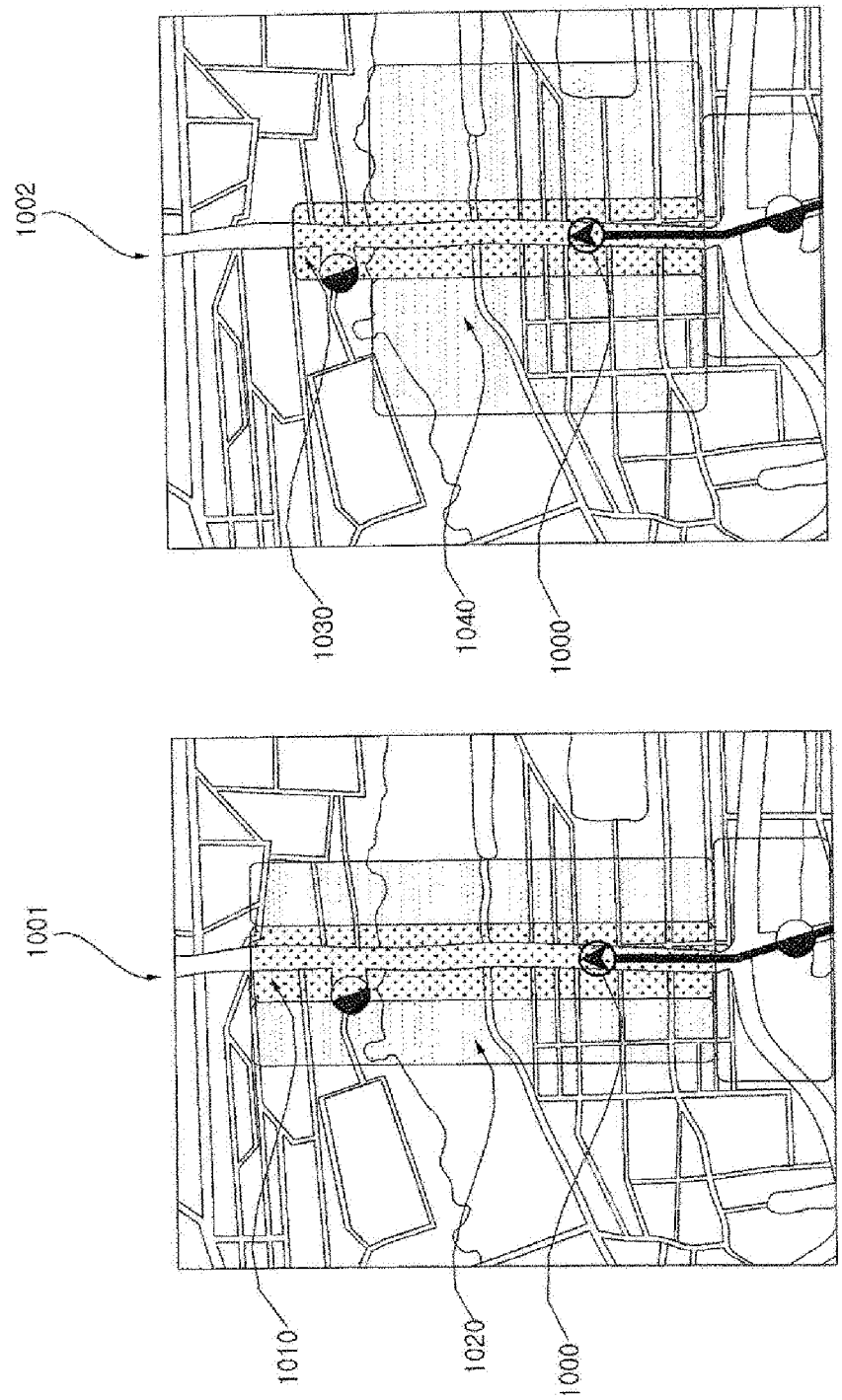

FIGS. 8 to 10 are diagrams illustrating the operation of an electronic device according to an embodiment of the present disclosure.

Referring to FIG. 8, the at least one sensor of the object detection device 210 of the vehicle 10 may have a sensing range. For example, each of the camera, the radar, the lidar, the ultrasonic sensor, and the infrared sensor may have a sensing range. The sensor mounted to sense an area in front of the vehicle 10 may have a longer sensing range than the sensor mounted to sense an area behind or beside the vehicle. The sensor mounted to sense an area behind or beside the vehicle 10 may have a wider sensing range than the sensor mounted to sense an area in front of the vehicle.

The processor 170 may receive data on the sensing range information of the at least one sensor of the object detection device 210 from at least one of the object detection device 210 or the main ECU 240 through the interface 180.

The processor 170 may set the geographical range of the electronic horizon data based on data on the sensing range information of the at least one sensor included in the object detection device (210 of FIG. 3).

The processor 170 may set the geographical range of the electronic horizon data such that the geographical range corresponds to the sensing range of the at least one sensor of the object detection device 210. The processor 170 may generate horizon path data corresponding to the sensing range of the at least one sensor of the object detection device 210. The horizon path data may include main path data and sub-path data.

The processor 170 may generate main path data at the location 801 of the vehicle 10 based on the sensing range of the sensor for sensing an area in front of the vehicle 10. The processor 170 may generate sub-path data at the location 801 of the vehicle 10 based on the sensing range of the sensor for sensing an area behind or beside the vehicle 10.

Meanwhile, according to an embodiment, when the sensing range of the at least one sensor of the object detection device 210 changes, the processor 170 may change the geographical range of the electronic horizon data according to the changed sensing range. For example, when the sensing range is reduced due to failure of the sensor or the like, the processor 170 may reduce the geographical range of the electronic horizon data.

As such, since the geographical range of the electronic horizon data is set so as to correspond to the sensing range of the at least one sensor of the object detection device 210, a path beyond the sensing range is not generated, yet safe driving is ensured within the sensing range of the sensor.

Referring to FIG. 9, the processor 170 may receive data on the driving speed information of the vehicle 10 from at least one of the sensing unit 270 or the main ECU 240.

The processor 170 may set the geographical range of the electronic horizon data based on data on the driving speed information of the vehicle 10. The processor 170 may generate horizon path data corresponding to the driving speed information of the vehicle 10. The horizon path data may include main path data and sub-path data.

Upon determining that the driving speed of the vehicle 10 is decreasing, the processor 170 may reduce the geographical range of the main path in the traveling direction of the vehicle 10. Upon determining that the driving speed of the vehicle 10 is increasing, the processor 170 may increase the geographical range of the main path in the traveling direction of the vehicle 10.

Upon determining that the driving speed of the vehicle 10 is decreasing, the processor 170 may increase the geographical range of the sub-path in the leftward-rightward direction of the vehicle 10. Upon determining that the driving speed of the vehicle 10 is increasing, the processor 170 may reduce the geographical range of the main path in the leftward-rightward direction of the vehicle 10.

Reference numeral 901 illustrates the case in which the vehicle 10 is traveling at a first driving speed, and reference numeral 902 illustrates the case in which the vehicle 10 is traveling at a second driving speed. The first driving speed is greater than the second driving speed.

When the vehicle 10 is traveling at the first driving speed, the processor 170 may set the geographical range 910 of the main path in the forward traveling direction at the location 900 of the vehicle 10 to be larger than when the vehicle 10 is traveling at the second driving speed. When the vehicle 10 is traveling at the second driving speed, the processor 170 may set the geographical range 930 of the main path in the forward traveling direction at the location 900 of the vehicle 10 to be smaller than when the vehicle 10 is traveling at the first driving speed.

When the vehicle 10 is traveling at the first driving speed, the processor 170 may set the geographical range 920 of the sub-path in the leftward-rightward direction at the location 900 of the vehicle 10 to be smaller than when the vehicle 10 is traveling at the second driving speed. When the vehicle 10 is traveling at the second driving speed, the processor 170 may set the geographical range 940 of the sub-path in the leftward-rightward direction at the location 900 of the vehicle 10 to be larger than when the vehicle 10 is traveling at the first driving speed.

Meanwhile, the processor 170 may receive data on information about the type of road on which the vehicle 10 is traveling from at least one of the object detection device 210, the communication device 220, or the main ECU 240.

The processor 170 may set the geographical range of the electronic horizon data based on data on the information about the type of road on which the vehicle 10 is traveling. The processor 170 may generate horizon path data corresponding to the information about the type of road on which the vehicle 10 is traveling. The horizon path data may include main path data and sub-path data.

When the vehicle 10 is traveling on an expressway, the processor 170 may set the geographical range of the main path in the forward traveling direction at the location of the vehicle 10 to be larger than when the vehicle 10 travels on a general road. When the vehicle 10 is traveling on an expressway, the processor 170 may set the geographical range of the sub-path in the leftward-rightward direction at the location of the vehicle 10 to be smaller than when the vehicle 10 travels on a general road.

When the vehicle 10 is traveling on a general road, the processor 170 may set the geographical range of the main path in the forward traveling direction at the location of the vehicle to be smaller than when the vehicle 10 travels on an expressway. When the vehicle 10 is traveling on a general road, the processor 170 may set the geographical range of the sub-path in the leftward-rightward direction at the location of the vehicle 10 to be larger than when the vehicle 10 travels on an expressway.

Referring to FIG. 10, the processor 170 may receive data on information about a traffic volume in an area around the vehicle from at least one of the object detection device 210, the communication device 220, or the main ECU 240.

The processor 170 may set the geographical range of the electronic horizon data based on data on the information about a traffic volume in an area around the vehicle 10. The area around the vehicle 10 may be an area within a specific radius from the vehicle 10. The processor 170 may generate horizon path data corresponding to the traffic volume information. The horizon path data may include main path data and sub-path data.

Upon determining that the traffic volume in an area around the vehicle 10 is increasing, the processor 170 may reduce the geographical range of the main path (from 1010 to 1030) in the traveling direction of the vehicle 10. Upon determining that the traffic volume in an area around the vehicle 10 is decreasing, the processor 170 may increase the geographical range of the main path (from 1030 to 1010) in the traveling direction of the vehicle 10.

Upon determining that the traffic volume in an area around the vehicle 10 is increasing, the processor 170 may increase the geographical range of the sub-path (from 1020 to 1040) in the leftward-rightward direction of the vehicle 10. Upon determining that the traffic volume in an area around the vehicle 10 is decreasing, the processor 170 may reduce the geographical range of the sub-path (from 1040 to 1020) in the leftward-rightward direction of the vehicle 10.

Through the above-described control operation, the electronic device may provide electronic horizon data that is more suitable for driving conditions, whereby the vehicle 10 is capable of reaching a final destination within a shorter time.

The above-described present disclosure may be implemented as computer-readable code stored on a computer-readable recording medium. The computer-readable recording medium may be any type of recording device in which data is stored in a computer-readable manner. Examples of the computer-readable recording medium include a Hard Disk Drive (HDD), a Solid-State Disk (SSD), a Silicon Disk Drive (SDD), ROM, RAM, a CD-ROM, a magnetic tape, a floppy disk, an optical data storage device, a carrier wave (e.g. transmission via the Internet), etc. In addition, the computer may include a processor or a controller. The above embodiments are therefore to be construed in all aspects as illustrative and not restrictive. The scope of the disclosure should be determined by reasonable interpretation of the appended claims, and all equivalent modifications made without departing from the disclosure should be considered to be included in the following claims.

DESCRIPTION OF REFERENCE NUMERALS

1: system
10: vehicle
100: electronic device
170: processor

The invention claimed is:

1. A vehicular electronic device comprising:
a power supply configured to supply power;
an interface configured to receive high-definition (HD) map data on a specific area from a server through a communication device and to receive data on driving condition information of a vehicle; and
at least one processor configured to continuously generate electronic horizon data on the specific area based on the HD map data in a state of receiving the power and to set a geographical range of the electronic horizon data based on data on the driving condition information,
wherein the electronic horizon data comprises horizon path data comprising data regarding (i) a main path that is defined as a trajectory obtained by connecting roads having a high relative probability of being selected and (ii) a sub-path that is a path branching from at least one decision point on the main path,
wherein the driving condition information comprises traffic volume information, and
wherein, based on a determination that a traffic volume is increasing, the processor is configured to:
reduce the geographical range of the main path in a traveling direction of the vehicle, and
increase the geographical range of the sub-path in a leftward-rightward direction of the vehicle.

2. The vehicular electronic device of claim 1, wherein the driving condition information comprises sensing range information of at least one sensor included in an object detection device, and
wherein the processor sets the geographical range of the electronic horizon data such that the geographical range corresponds to a sensing range of the at least one sensor.

3. The vehicular electronic device of claim 1, wherein the driving condition information comprises driving speed information of the vehicle, and
wherein, based on a determination that a driving speed of the vehicle is decreasing, the processor reduces the geographical range of the main path in the traveling direction of the vehicle, and increases the geographical range of the sub-path in the leftward-rightward direction of the vehicle.

4. The vehicular electronic device of claim 1, wherein the traffic volume information indicates the traffic volume in an area within a specific radius from the vehicle.

5. The vehicular electronic device of claim 1,
wherein, based on a determination that a traffic volume is decreasing, the processor is configured to:
increase the geographical range of the main path in a traveling direction of the vehicle, and
decrease the geographical range of the sub-path in a leftward-rightward direction of the vehicle.

6. An operation method of a vehicular electronic device, the method comprising:
receiving, by at least one processor, power;
receiving, by the at least one processor, high-definition (HD) map data on a specific area from a server through a communication device in a state of receiving the power;
receiving, by the at least one processor, data on driving condition information of a vehicle in a state of receiving the power;
setting, by the at least one processor, a geographical range of electronic horizon data based on the data on the driving condition information in the state of receiving the power; and
generating, by the at least one processor, electronic horizon data corresponding to the geographical range based on the HD map data in the state of receiving the power,
wherein the electronic horizon data comprises horizon path data comprising data regarding (i) a main path that is defined as a trajectory obtained by connecting roads having a high relative probability of being selected and (ii) a sub-path that is a path branching from at least one decision point on the main path,
wherein the driving condition information comprises traffic volume information, and
wherein setting the geographical range comprises, based on a determination that a traffic volume is increasing, (i) reducing the geographical range of the main path in a traveling direction of the vehicle and (ii) increasing the geographical range of the sub-path in a leftward-rightward direction of the vehicle.

7. The method of claim 6, wherein the driving condition information comprises sensing range information of at least one sensor included in an object detection device, and
wherein the setting comprises setting the geographical range of the electronic horizon data such that the geographical range corresponds to a sensing range of the at least one sensor.

8. The method of claim 6, wherein the driving condition information comprises driving speed information of the vehicle, and
the setting comprises, based on a determination that a driving speed of the vehicle is decreasing, reducing, by the at least one processor, the geographical range of the main path in the traveling direction of the vehicle, and increasing the geographical range of the sub-path in the leftward-rightward direction of the vehicle.

9. The method of claim 6, wherein the traffic volume information indicates the traffic volume in an area within a specific radius from the vehicle.

10. The method of claim 6,
wherein setting the geographical range comprises, based on a determination that a traffic volume is decreasing, (i) increasing the geographical range of the main path in the traveling direction of the vehicle and (ii) decreasing the geographical range of the sub-path in the leftward-rightward direction of the vehicle.

11. A system comprising:
a server configured to provide high-definition (HD) map data; and
at least one vehicle comprising an electronic device configured to receive the HD map data,
wherein the electronic device comprises:
a power supply configured to supply power;
an interface configured to receive the HD map data on a specific area from the server through a communication device and to receive data on driving condition information of the at least one vehicle; and
a processor configured to continuously generate electronic horizon data on the specific area based on the HD map data in a state of receiving the power and to set a geographical range of the electronic horizon data based on data on the driving condition information,
wherein the electronic horizon data comprises horizon path data comprising data regarding (i) a main path that is defined as a trajectory obtained by connecting roads having a high relative probability of being selected and (ii) a sub-path that is a path branching from at least one decision point on the main path,
wherein the driving condition information comprises traffic volume information, and wherein, based on a determination that a traffic volume is increasing, the processor is configured to:
reduce the geographical range of the main path in a traveling direction of the vehicle, and
increase the geographical range of the sub-path in a leftward-rightward direction of the vehicle.

12. The system of claim 11, wherein the driving condition information comprises sensing range information of at least one sensor included in an object detection device, and
wherein the processor sets the geographical range of the electronic horizon data such that the geographical range corresponds to a sensing range of the at least one sensor.

13. The system of claim 11, wherein the driving condition information comprises driving speed information of the vehicle, and
wherein, based on a determination that a driving speed of the vehicle is decreasing, the processor reduces the geographical range of the main path in the traveling direction of the vehicle, and increases the geographical range of the sub-path in the leftward-rightward direction of the vehicle.

14. The system of claim 11, wherein the traffic volume information indicates the traffic volume in an area within a specific radius from the vehicle.

15. The system of claim 11,
wherein, based on a determination that a traffic volume is decreasing, the processor is configured to:
increase the geographical range of the main path in the traveling direction of the vehicle, and
decrease the geographical range of the sub-path in the leftward-rightward direction of the vehicle.

* * * * *